United States Patent [19]

Heilman et al.

[11] Patent Number: 4,573,902

[45] Date of Patent: Mar. 4, 1986

[54] MACHINE FOR MANUFACTURING FOAM BUILDING BLOCKS

[75] Inventors: Nikolaus J. Heilman, Kent; David A. Wix, Seattle; Gary M. Egerer, Auburn, all of Wash.

[73] Assignee: Interblock Partners, Ltd., Kent, Wash.

[21] Appl. No.: 507,548

[22] Filed: Jun. 24, 1983

[51] Int. Cl.$^4$ .................. B29C 45/04; B29C 45/42; B29C 45/64

[52] U.S. Cl. .................................. 425/543; 264/51; 264/236; 264/328.11; 264/334; 264/DIG. 83; 425/576; 425/589; 425/595; 425/441; 425/444; 425/817 R

[58] Field of Search ............... 264/54, DIG. 83, 51; 425/817 R, 543, 576, 595, 589, 436 R, 441, 444

[56] References Cited

U.S. PATENT DOCUMENTS

| | | | |
|---|---|---|---|
| 3,090,078 | 5/1963 | Ackles | 264/46.8 X |
| 3,684,420 | 8/1972 | Barker | 264/DIG. 83 |
| 3,712,771 | 1/1973 | White et al. | 264/46.8 X |
| 3,742,487 | 7/1973 | Andrews | 425/817 C X |
| 3,813,463 | 5/1974 | Conger | 264/54 X |
| 4,008,990 | 2/1977 | Hiemer et al. | 425/812 X |
| 4,218,203 | 8/1980 | Tilgner | 425/543 X |

OTHER PUBLICATIONS

Alderfer, Sterling, "One Shot Polyurethane Production," in *Rubber Age*, Apr. 1963, pp. 89–93.

*Primary Examiner*—Philip Anderson
*Attorney, Agent, or Firm*—Christensen, O'Connor, Johnson & Kindness

[57] ABSTRACT

A machine for manufacturing foam building blocks (39) and the like wherein a plurality of two-piece forming molds (21) are continuously moved by a conveyor mechanism along a closed path-of-travel (22) is disclosed. Filling, curing and injection stations (31, 32 and 33) are located along the path-of-travel (22). As a mold (21) enters the filling station (31), the nozzle (37) of a foam gun (35) enters a hole (34) in the top of the mold (21) and moves with the mold (21) as that mold continues to move along the path-of-travel (22). At the end of the filling station (31), after the foam gun (35) has injected a suitable amount of resin, curing and foaming agent materials into the mold (21), the nozzle (37) rises from the hole (34). Thereafter, a cap-latch (36) is moved into a hole closed position. In addition to closing the hole (34), the cap-latch (36) forms one of two latches that latch the two mold pieces (21a and 21b) together. The other latch (38) is located on the opposite side of the forming molds (21). After leaving the filling station (31), the forming molds pass through the curing station (32) where they are heated to a suitable temperature. After leaving the curing station (32), the forming molds (21) enter the ejection station (33) where the latches (36, 38) are opened, the forming mold pieces (21a and 21b) are split apart and the finished foam block (39) is ejected. Then, the forming mold pieces (21a and 21b) are brought back together and the latch (38) is closed. Thereafter, the forming molds (21) are moved to the filling station (31) and the cycle is repeated.

14 Claims, 18 Drawing Figures

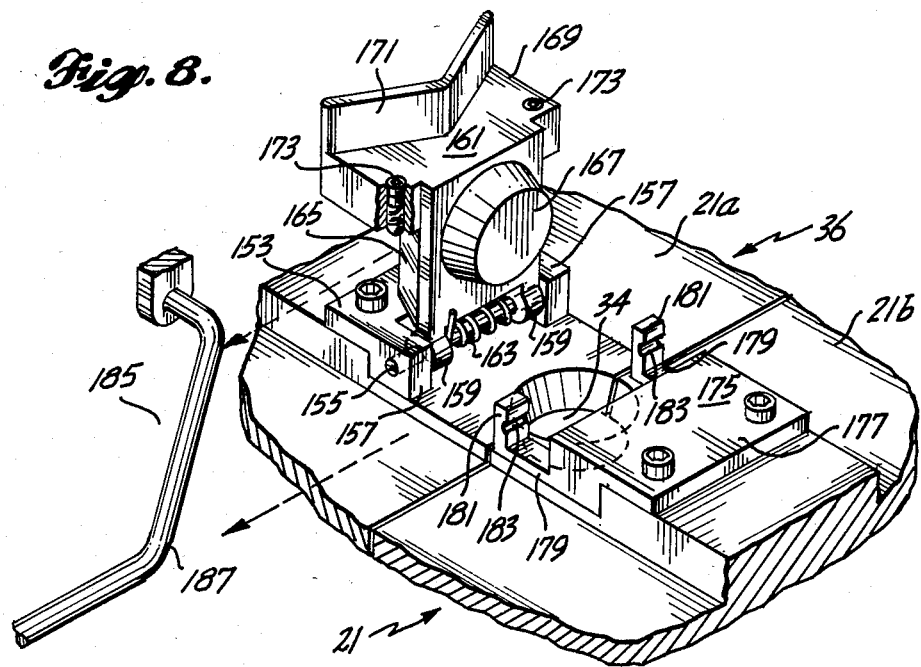

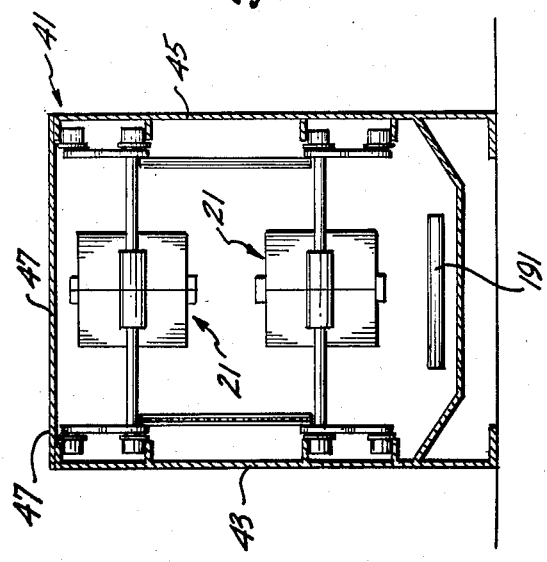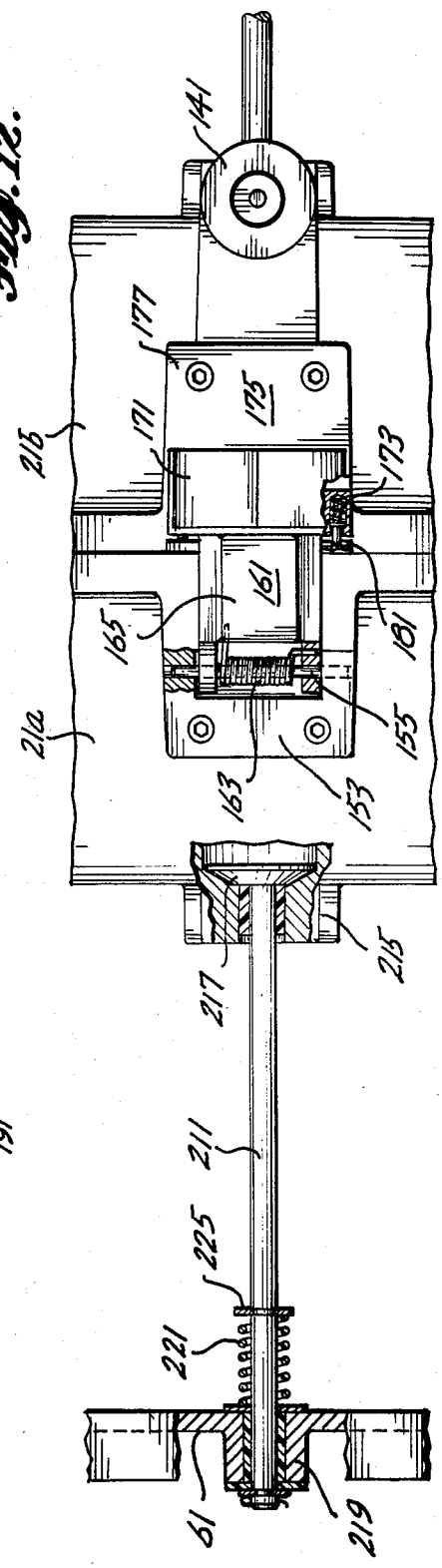

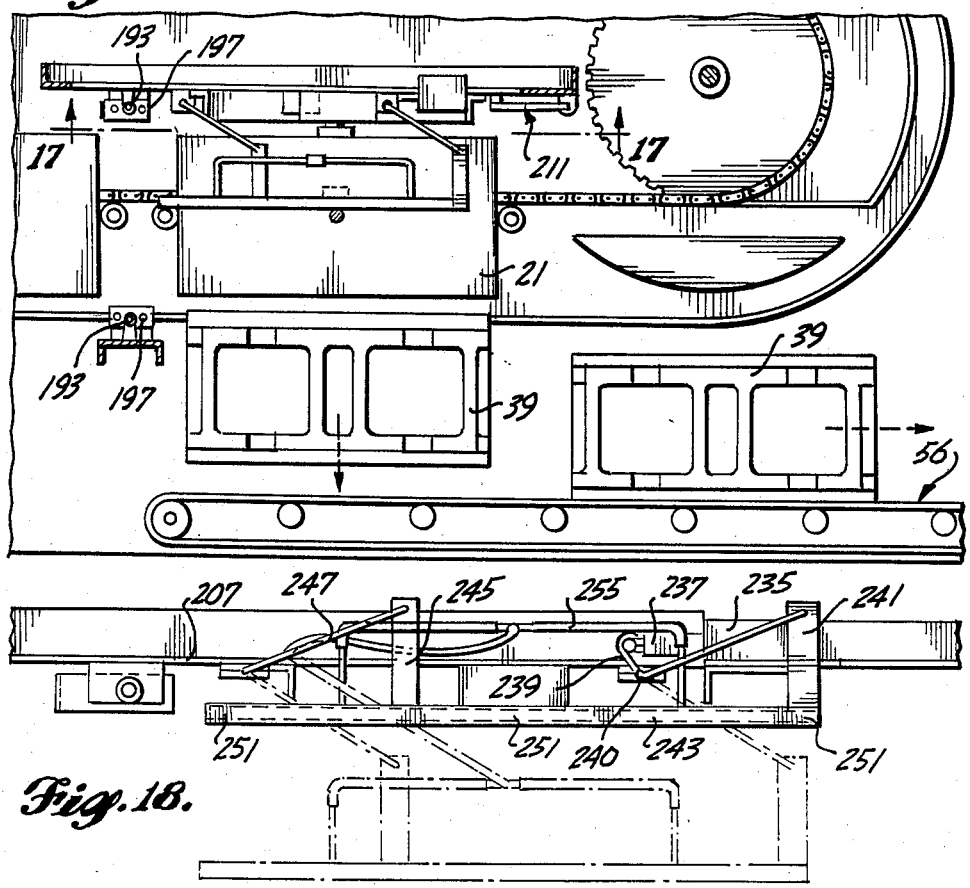
Fig. 11.
Fig. 16.
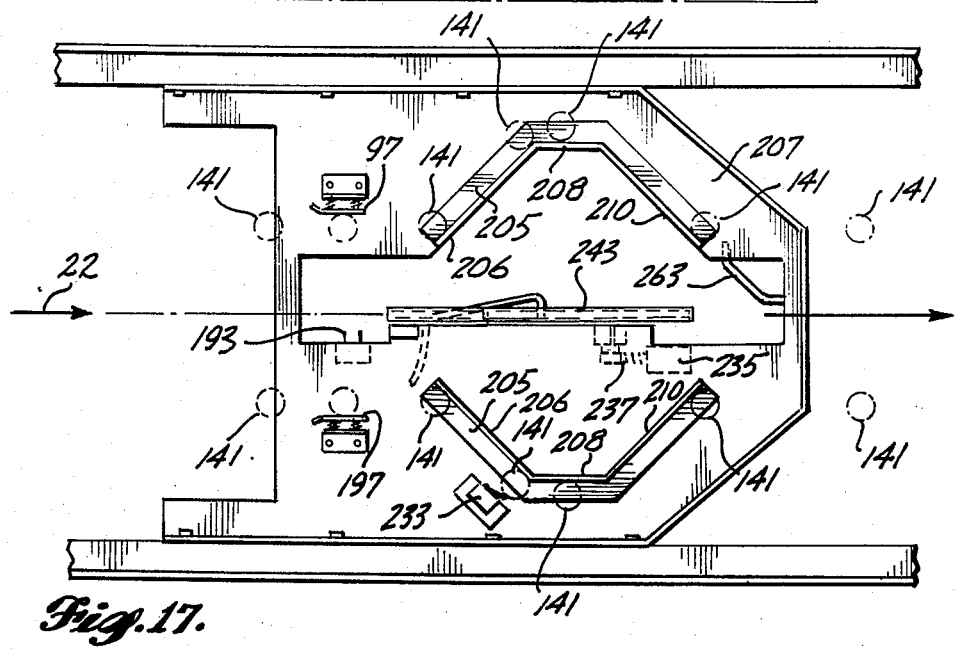
Fig. 17.

MACHINE FOR MANUFACTURING FOAM BUILDING BLOCKS

TECHNICAL AREA

This invention is directed to manufacturing machines and, more particularly, machines for manufacturing solid items from liquid raw materials, such as foam building blocks formed from liquid resin, curing and foaming agent materials.

BACKGROUND OF THE INVENTION

While the present invention was designed and developed for use in manufacturing foam building blocks, and is described in connection with such manufacturing, it is to be understood that the invention may also find use in connection with the manufacture of other products.

In the past, various types of foam building blocks have been proposed. The usual apparatus for manufacturing such blocks has included separate and discrete molds into which resin, curing and foaming agent materials are injected. If curing of the injected materials at an elevated temperature is required (or desired) as is normally the case, the filled molds are transported to an oven. After a suitable curing time has elapsed, the molds are removed from the oven and opened. In the past, the foregoing steps have normally been carried out by hand, usually with the assistance of manual or power tools of a general nature, such as foam injection guns, conventional transportation equipment, etc. Because the steps have been carried out manually, the cost attendant to creating foam building blocks has been greater than desired. The present invention is directed to overcoming this and other disadvantages by providing a machine that continuously manufactures foam building blocks with little or no manual involvement, other than starting the machine, keeping it supplied with raw materials and removing manufactured blocks.

SUMMARY OF THE INVENTION

In accordance with this invention, a machine for manufacturing foam building blocks and the like is provided. The machine includes a plurality of forming molds moved by a conveyor mechanism along a closed path-of-travel. Filling, curing and ejection stations are located along the path of travel. At the filling station, resin, curing and foaming agent materials are injected into the molds. After leaving the filling station, the molds pass through the curing station where they are heated to a suitable temperature. After leaving the curing station, the molds enter the ejection station whereat they are opened and finished products, e.g., foam building blocks, are ejected. Thereafter, the molds are closed and returned to the filling station; and, the cycle is repeated.

In accordance with further aspects of this invention, forming mold movement along the closed path-of-travel is continuous, including movement through the filling and ejection stations.

In accordance with other aspects of this invention, a foam material injection mechanism is located at the filling station. The foam material injection mechanism includes a foam gun having a nozzle that enters a hole in the top of each forming mold as the mold enters the filling station. The foam gun moves with the moving forming mold as the mold moves through the filling station. During such movement, the resin, curing and foaming agent materials are injected into the mold. At the end of the filling station, the foam gun nozzle is withdrawn from the mold hole and the foam gun is returned to the entrance end of the filling station.

In accordance with other aspects of this invention, the forming molds are two-piece molds. Preferably, the two pieces are mirror images of one another and join one another along the vertical center plane of the mold.

In accordance with still other aspects of this invention, the hole in the top of the forming molds through which the resin, curing and foaming agent materials are injected into the molds is closed by a cap, which also forms part of a latch mechanism that holds the mold pieces together. The cap-latch of each forming mold is closed as the mold leaves the filling station. Preferably, the cap-latch is spring loaded open and is closed by impinging on a latch closure arm.

In accordance with additional aspects of this invention, both the cap-latch and another latch located on the side of the forming molds opposite to the side on which the cap-latch is located are opened as each mold enters the ejection station. Further, the "opposite" latch is closed as each forming mold leaves the ejection station, the cap-latch remaining open.

In accordance with the yet other aspects of this invention, latch opening is eased by applying pressure to the forming molds, laterally in line with the latches. Preferably, the lateral pressure is provided by mounting rollers on the mold top and bottom, in line with the latches, and positioning spring loaded plates such that they are impinged on at the position where the latches are to be opened. The spring-loaded plates that create an inward force that relieves latch pressure, allowing the latches to be opened with a minimal amount of force.

In accordance with still further aspects of this invention, a pair of rollers that relieve pressure on the latches also impinge on rail cams located at the ejection station. The rail cams apply pressure to the forming mold pieces via the rollers, which causes the mold pieces to part. As the mold pieces part, the formed product is held in a central location between the mold pieces. As a result, the product is "ejected" from the mold pieces. After the mold pieces have reached a location beyond the edges of the formed product, the centering mechanism releases the product. Preferably, the centering mechanism comprises a pair of aligned, enlarged head rods lying orthogonal to the mold path-of-travel and a mechanism for preventing the rods from moving laterally as the mold pieces are moved laterally in response to the force produced by the rail cams. Further, preferably, a mechanism is provided for allowing the rods to move laterally after the mold pieces have cleared the formed product. Also, preferably, a mechanism is provided for pushing a formed product from the region between the rods after the rods have moved outwardly, which mechanism also sprays the interior of the mold pieces with a releasing agent, if desired.

In accordance with yet further aspects of this invention, the continuous path-of-travel is oval and vertical; and, a continuous conveyor mechanism supports and moves the forming molds along the path-of-travel. Preferably, the molds are supported by brackets and the brackets are supported by tracks. More specifically, preferably, the brackets include rollers that move in tracks formed in opposed vertical sidewalls. Further, the brackets are attached to continuous conveyor chains driven by a suitable source of power.

As will be readily appreciated from the foregoing description, the invention provides a machine for manufacturing foam building blocks and the like with substantially little or no manual involvement other than starting the machine, keeping it supplied with raw materials (e.g., resin, curing and foaming agent materials) and removing manufactured products. The preferred form of the invention outlined above, i.e., the form including an oval, vertical path-of-travel allows the machine to be sized such that it can be readily transported by a large flatbed truck. As a result, rather than forming foam building blocks at a manufacturing location and transporting them to a job site, the manufacturing machine can be transported to the job site and used to produce foam building blocks as they are needed.

BRIEF DESCRIPTION OF THE DRAWINGS

The foregoing objects and many of the attendant advantages of this invention will become more readily appreciated as the same becomes better understood by reference to the following detailed description when taken in conjunction with the accompanied drawings wherein:

FIG. 8 is a pictorial view illustrating the cap-latch in its open position and the mechanism that closes the cap-latch as a mold leaves the filling station;

FIG. 9 is a pictorial view of the cap-latch in its closed position;

FIG. 10 is a vertical, cross-sectional view of the curing station taken along line 10—10 of FIG. 2;

FIG. 11 is a vertical, cross-sectional view of the ejection station of the machine illustrated in FIG. 2;

FIG. 12 is a top plan view of the center area of a forming mold;

FIG. 17 is a cross-sectional view taken along line 17—17 of FIG. 11; and,

FIG. 18 is an elevational view illustrating the mechanism that ejects formed blocks from an open mold at the ejection station and simultaneously applies a releasing agent to the mold interior after release.

DESCRIPTION OF THE PREFERRED EMBODIMENT

Figure 1:
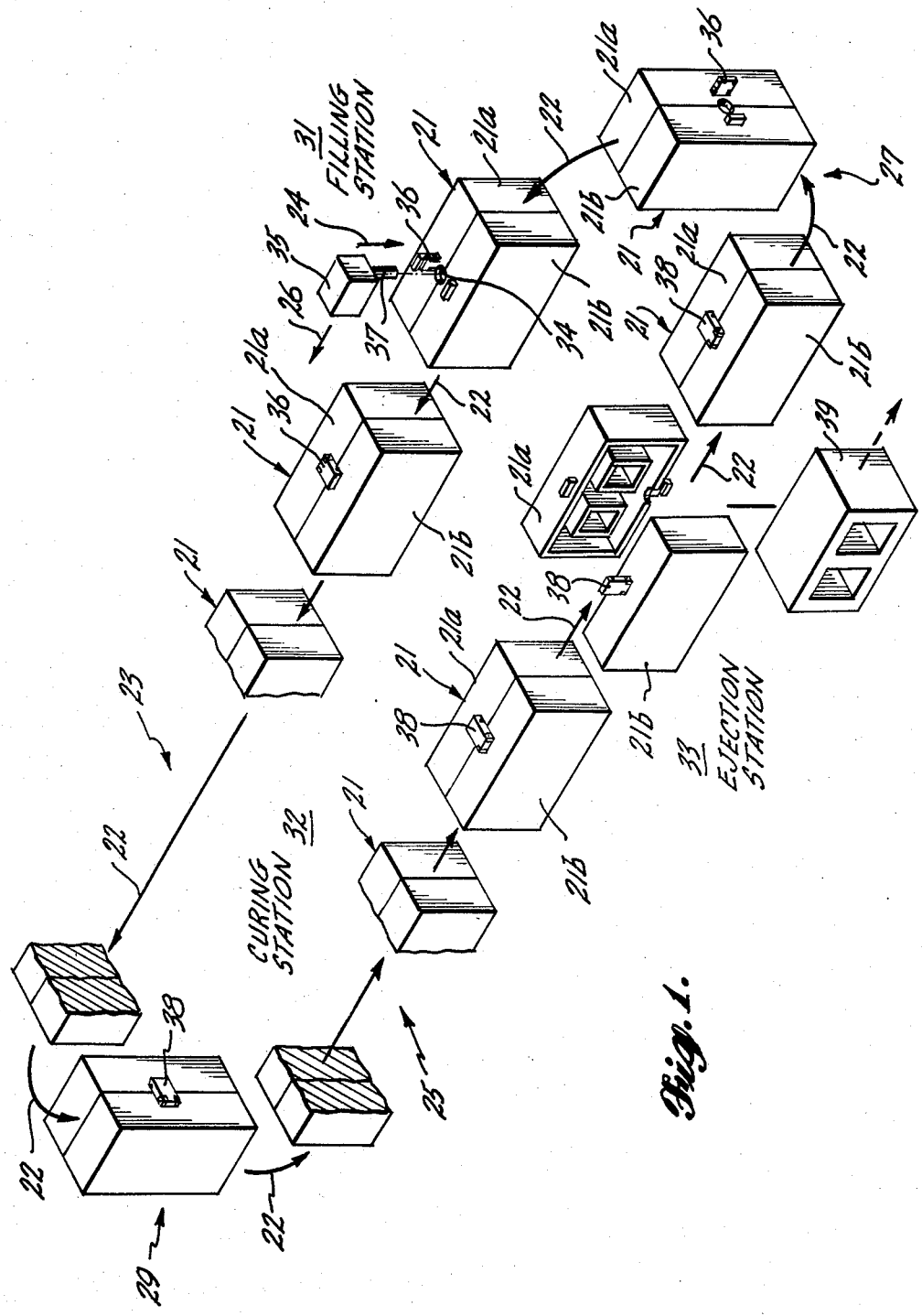
FIG. 1 is a pictorial view illustrating the path of travel of forming molds as they move through the preferred embodiment of a machine formed in accordance with the invention.

In accordance with this invention, a plurality of forming molds 21 are moved along a path-of-travel 22 that includes a filling station 31, a curing station 32, and an ejection station 33. As illustrated in FIG. 1, preferably, the path-of-travel 22 followed by the forming molds 21 is oval and lies in a vertical plane. More specifically, the path-of-travel 22 includes an elongate, horizontally oriented upper run 23 lying vertically above an elongate, horizontally oriented lower run 25. The upper and lower horizontal runs 23 and 25 are joined by semicircularly curved end runs 27 and 29. Further, preferably, the filling station 31 lies above the ejection station 33 at one end of the upper and lower horizontal runs 23 and 25. The curing station encompasses the remaining portions of the horizontal runs 23 and 25 and the connecting curved end run 29.

As also illustrated in FIG. 1, the forming molds 21 are formed of two pieces 21a and 21b. The two pieces are mirror images of one another and meet along a vertical plane when joined. Except during a pass through the ejection station, the mold pieces 21a and 21b are joined together; and, latched in the manner described below.

As more fully described below, the forming molds 21 are moved along their path-of-travel 22 by a conveyor mechanism. As also more fully described below, the forming mold pieces 21a and 21b are latched together by two latches located on opposed (e.g., top and bottom) sides of the forming molds. One of these latches—the cap-latch 36—closes a hole 34 through which resin, curing and foaming agent materials are injected into the molds 21. The other latch 38 is simply a latch formed similarly to the latch part of the cap-latch.

After leaving the ejection station 23, the forming molds are inverted as they move along the curved end run 27 that joins the ejection station 33 and the filling station 31, i.e., the top becomes the bottom and vice versa. As this inversion occurs, the side of the mold containing the cap-latch 36, which is open, is brought to the top. The latch 38, which is closed when a mold leaves the ejection station 33, lies at the bottom of the mold. Since the caplatch 36 is open when a forming mold 21 enters the filling station 31, the hole 34 closed by the top latch is open.

As a forming mold 21 enters the filling station 31, a foam gun 35 is lowered as shown by the arrow 24. As the foam gun 35 is lowered, the nozzle 37 of the gun enters the hole 34 of the forming mold 21 entering the filling station. After entering the hole, the foam gun 35 moves with the moving forming mold 21 as shown by the arrow 26. As the foam gun moves with the forming mold 21, the gun injects suitable form creating materials (e.g., resin, curing and foaming agent materials) into the mold 21. At the end of the filling station 31, the foam gun 35 is raised whereby the nozzle 37 is withdrawn from the hole 34. Thereafter, as the forming mold 21 leaves the filling station 31, the cap-latch is closed whereby the hole 34 is capped and the two pieces 21a and 21b of the forming mold 21 are further latched together.

After the cap-latch 36 is closed, the forming molds 21 are moved through the curing station 32. As they pass through the curing station the forming molds 21 are again inverted. After passing through the curing station 32, the forming molds 21 enter the ejection station 33. As each forming mold 21 enters the ejection station, its cap-latch 36 and its latch 38 are opened. Thereafter, the two pieces 21a and 21b of the forming mold 21 are moved apart, along a horizontal axis that lies orthogonal to the path-of-travel 22. As will be better understood from the following description, as the two pieces 21a and 21b are moved apart, the formed foam building block 39 is held centered between the opening forming mold pieces 21a and 21b. As a result, the formed foam building block is "ejected" from the mold pieces. The forming mold pieces 21a and 21b are moved to a location beyond the lateral, vertical edges of the formed foam building block 39. When this position is reached, the centering mechanism that holds the foam building block is withdrawn, allowing the block to drop and be ejected. The formed foam building block 39 is ejected from between the forming mold pieces 21a and 21b by an ejection mechanism that also sprays a releasing agent into the interior of the mold pieces. Thereafter, the forming mold pieces 21a and 21b are brought back together and the latch 38 is closed; and, the forming molds are moved to the filling station 31. As described above, during this movement the forming molds 21 are inverted.

Figure 2:
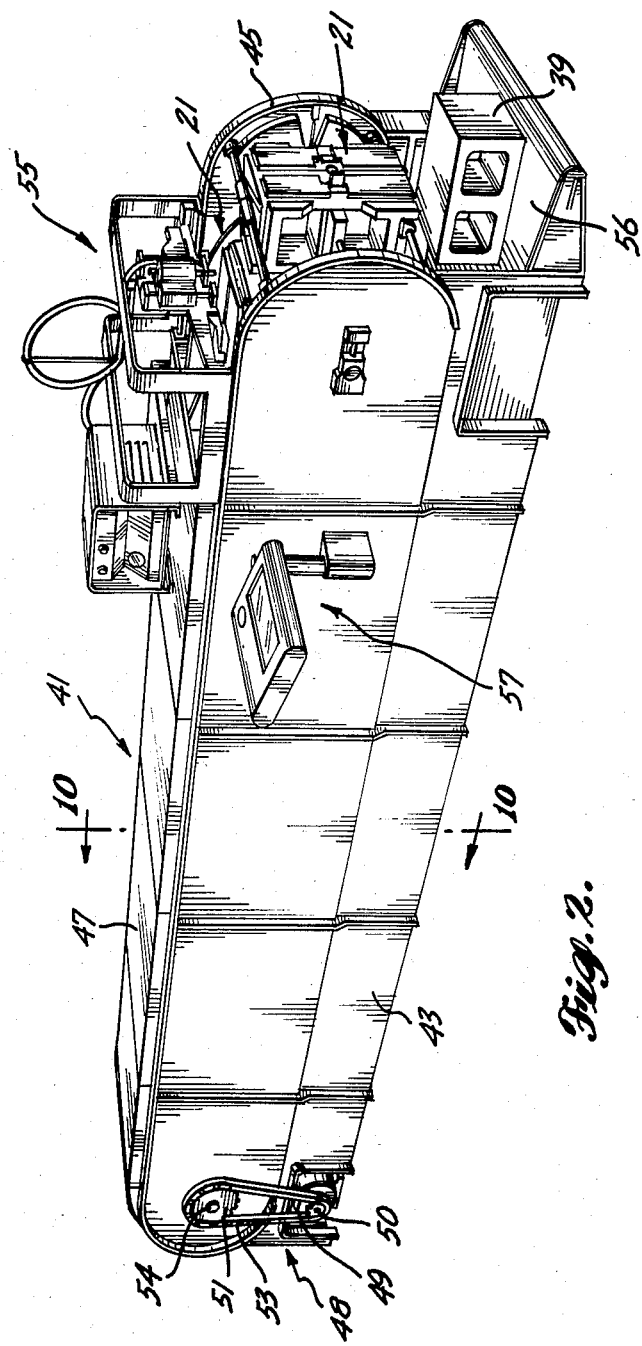
FIG. 2 is a pictorial view of a machine formed in accordance with the invention for manufacturing foam building blocks.

FIG. 2 is a pictorial view of a preferred embodiment of a machine for manufacturing foam building blocks formed in accordance with the invention. The embodiment of the invention illustrated in FIG. 2 includes a housing 41 that houses the mechanism for carrying out the various functions illustrated in FIG. 1 and described above. The housing 41 includes a pair of vertical sidewalls 43 and 45 and a top 47. Since the path-of-travel followed by the forming molds 21 defines a vertical, horizontally elongate oval, the housing 41 is horizontally elongate and has semicircularly curved ends. Preferably, the sidewalls 43 and 45 are cast from a suitable material such as an aluminum alloy; and, the top 47 is formed of reinforced sheets of the same material.

Located at the curing station end of the elongate housing 41 is a drive mechanism 48 comprising a suitable power source such as an electric motor 41. Mounted on the shaft of the motor 49 is a small sprocket 50 connected to a large sprocket 51 by a chain 53. The large sprocket 51 is mounted on the end of a shaft 54 rotatably mounted in the sidewalls 43 and 45.

As illustrated in FIG. 2, the end of the housing 41 at which the filling and ejection stations 31 and 33 are located is open. Mounted atop the housing 41, above the filling station, is a foam material injection mechanism 55 that includes the foam gun 35 and a hereinafter described horizontal and vertical carriage mechanism. Located beneath the ejection station is a belt conveyor 56 that removes finished foam building blocks 39 from the housing 41. Finally, located on one of the side walls 43 of the housing 41 is a control console 57. The control console allows an operator to control speed and operation of the machine; and, may include a counter and other mechanism for counting the number of blocks produced, controlling the speed of the motor, etc. Since such normal operator control devices per se do not form part of the invention, they will not be described.

As best illustrated in FIGS. 3-7, 13 and 16, the conveyor mechanism that moves the forming molds 21 along their path-of-travel 22 includes: T-shaped support plates 61; tracks 63 formed in the interior faces of the sidewalls 43 and 45; chains 65; and sprockets 67. A pair of support plates 61 are associated with each forming mold 21. One plate 61 of each pair is located adjacent one of the vertical sidewall 43 and the other plate 61 is located adjacent the other vertical sidewall 45 of the housing 41. The arm, or cross-member, of the T-shaped support plates 61 are curved toward the leg of the T. Rotatably mounted at outer ends of the cross-member of the T-shaped bracket 61 are leading and trailing rollers 69a and 69b. Located at the apex of the curved cross-members are center rollers 69c. The leading, trailing and center rollers 69a, 69b and 69c ride in the tracks 63 formed in the interior faces of the vertical sidewalls 43 and 45 of the housing 41 in the manner next described.

The tracks 63 formed in the inner faces of the vertical sidewalls 43 and 45 of the housing 41 are defined by an outer rail 71 and an inner rail 73. In the upper and lower horizontal runs 23 and 25 of the path-of-travel 22 of the forming molds 21, the rails are spaced apart by the vertical distance between the leading and trailing rollers 69a and 69b and the middle roller 69c. In this region the middle roller 69c impinges on the inner surface of the outer rail 71 and the leading and trailing rollers 69a and 69b impinge on the outer surface of the inner rail 73. As a result, the leading and trailing rollers 69a and 69b provide support for the support plates 61 (which support the forming molds 21 in the manner hereinafter described) in the upper horizontal run 23 of the path-of-travel of the forming mold and the center roller 69c provides support in the lower horizontal run 25.

Figure 3:
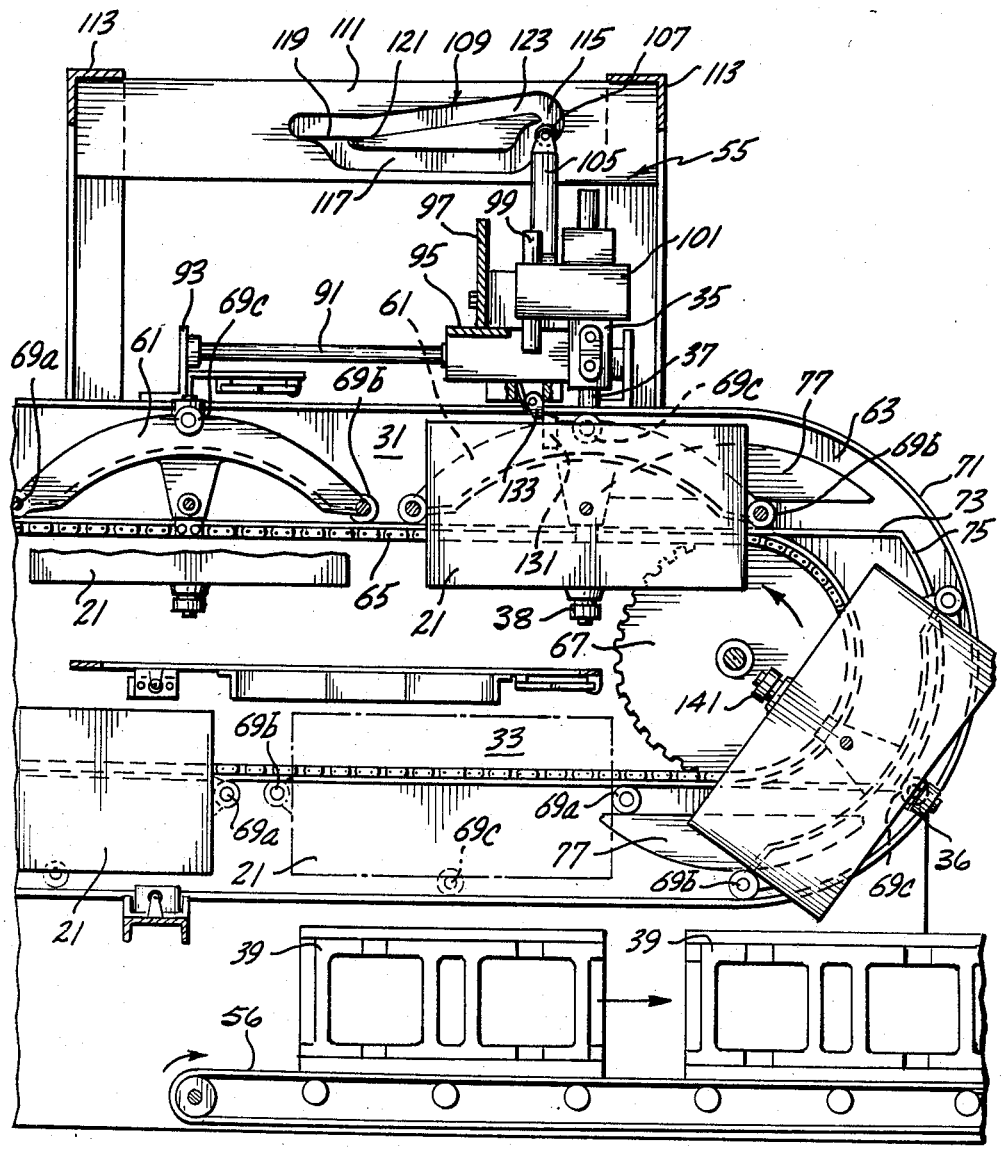
FIG. 3 is a vertical, cross-sectional view of the filling and ejection station end of the machine illustrated in FIG. 2.

As best illustrated in FIG. 3, in the semicircularly curved end runs 27 and 29, the outer rail 71 curves around a semicircular path. In the end runs 27 and 29, the inner rail 73 continues straight until it nears the outer rail 71, at which point it changes into a curved section 75 that lies parallel to, but spaced from, the outer rail 71. The width of the space between the curved section 75 and the curved outer rail 71 is slightly greater than the diameter of the leading, trailing and center rollers 69a, 69b and 69c.

Located between the ends of the straight sections of the inner rail 73 and the outer rails 71 are cresent-shaped guides 77. The cresent-shaped guides have an outer curved surface and a flat inner surface. The flat inner surface lies parallel, but spaced from, the adjacent end of the straight section of the inner rail 73 and the outer curved surface (which has the same radius of curvature as the curved sections 75 of the inner rail 73), lies parallel to, but spaced from, the outer rail 71. As with the width of the space between the curved section 75 and the outer rail 71, the width of the space between the inner flat surface of the crescent-shaped guides and the straight section of the inner rail 73 and the width of the space between curved surface of the crescent-shaped guide 77 and the outer rail 71 is slightly greater than the diameter of the leading, trailing and center rollers 69a, 69b and 69c, except where the crescent-shaped guides 77 diverge from the outer rail 71.

Turning now to a description of the paths followed by the leading, trailing and center rollers 69a, 69b and 69c as a T-shaped support plate 61 moves between the ejection station 33 and the filling station 31; the leading roller 69a passes through the space between the flat side of the lower crescent-shaped guide 77 and the outer surface of the lower straight section of the inner rail 73, as illustrated in the lower half of FIG. 3. The distance between the leading roller 69a and trailing roller 69b is such that when the leading roller 69a reaches the end of this space, the trailing roller 69b has not yet reached the beginning end thereof. When the leading roller 69a reaches the end of the space between the flat side of the lower crescent-shaped guide 77 and the outer surface of lower straight section of the inner rail 73, the leading roller 69a enters the space between the curved section 75 and the outer rail 71. As a result, the elevation of the leading roller 69a rises with respect to the elevation of the trailing roller 69b. This change in elevation rotates the T-shaped support plate 61 causing the trailing roller 69b to follow the center roller 69c through the path between the outer surface of the lower crescent-shaped guide 77 and the outer track 71, as shown on the right side of FIG. 3. A reversal of these paths occurs at the other end of the curved end region. Specifically, the leading roller 69a enters the space between the outer surface of the upper crescent-shaped guide 77 and the outer rail 71. The center roller 69c follows the same path. By the time the trailing roller 69b reaches the end of the space between the curved section 75 of the inner rail 73, the leading roller 69a has passed beyond the upper crescent-shaped guide 77 and is riding on the upper straight section of the inner rail 73. As a result, the trailing roller 69b enters the space between the flat surface of the upper crescent-shaped guide 77 and the inner rail 73, as also illustrated in the upper half of FIG. 3.

As noted above, outer and inner rails 71 and 73 of the type illustrated in FIG. 3 are formed on the inner surface of each of the vertical sidewalls 43 and 45 of the housing 41. Further, while not specifically illustrated in the drawings, it is to be understood that the sidewalls at the curing station end of the housing 41 have an outer and inner rail, and crescent-shaped guide configuration similar to that illustrated in FIG. 3.

The conveyor mechanism includes four large sprockets 67, one mounted on the inside face of each of the vertical sidewalls 43 and 45. The sprockets 67 located at the same end of the housing are mounted on common shafts whose axis of rotation is coincident with the center of the radius of curvature of the semicircular ends of the outer rail 71, which center is also coincident with the radius of curvature of the crescent-shaped guides 77 and the curved sections 75 of the inner rail 73. The shaft located at the curing station 32 end of the housing 41 is the same as the shaft 54 coupled to the motor 49 in the manner described above. The conveyor mechanism also includes two continuous chains 65, one looped around the sprockets 67 adjacent each of the sidewalls 43 and 45. Thus, a chain lies adjacent to the inner surface of each of the sidewalls 43 and 45. The ends of the legs of the T-shaped support plates 61 are attached to the chains 65 at spaced apart, transversely aligned locations. As a result, when the chains 65 are moved as a result of the motor 49 being energized, the T-shaped support plates 61 and, thus, the forming molds attached to and supported by the support plates in the manner next described, are moved.

Figure 4:
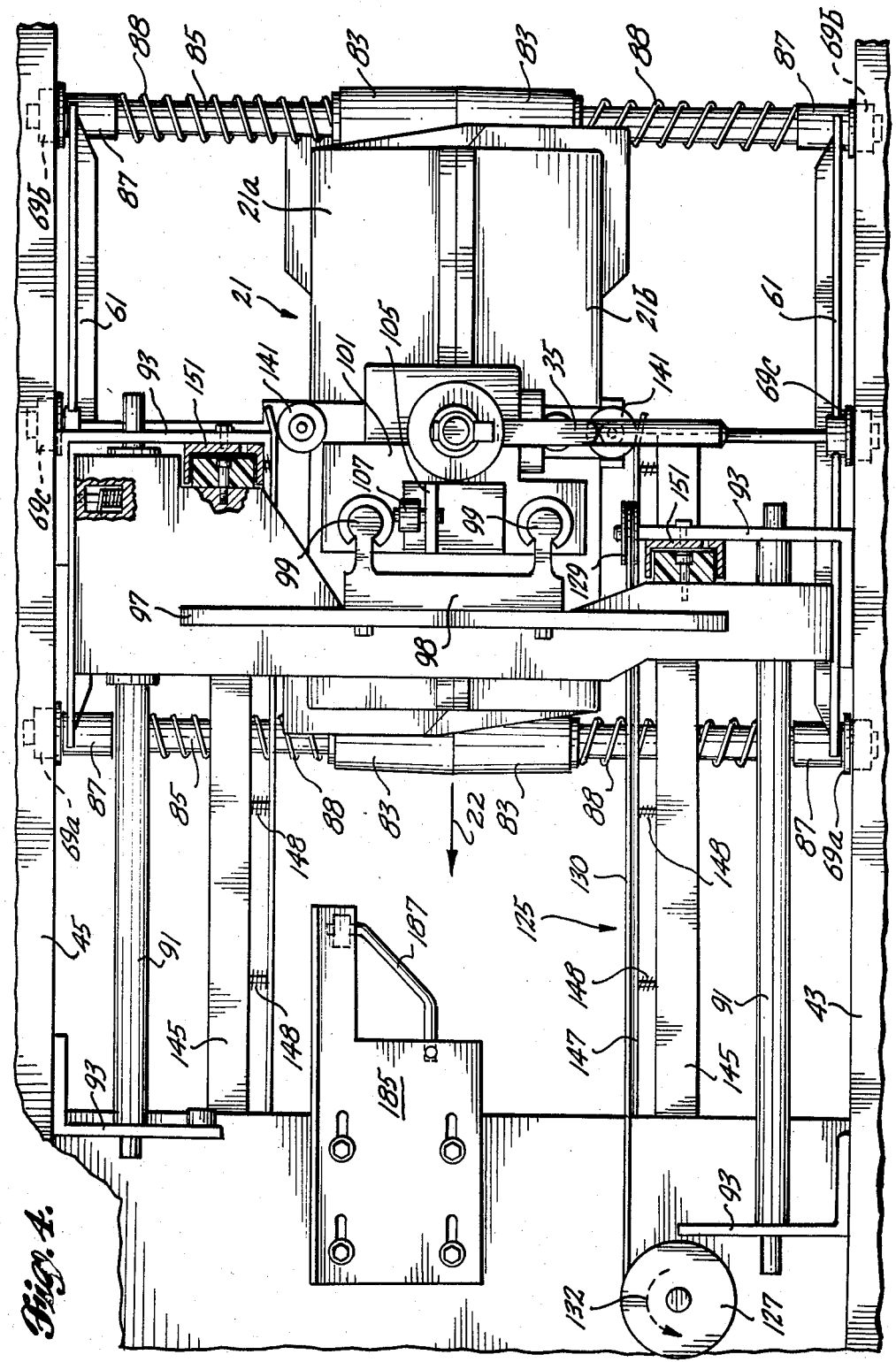
FIG. 4 is a top plan view of the filling station of the machine illustrated in FIG. 2.
Figure 5:
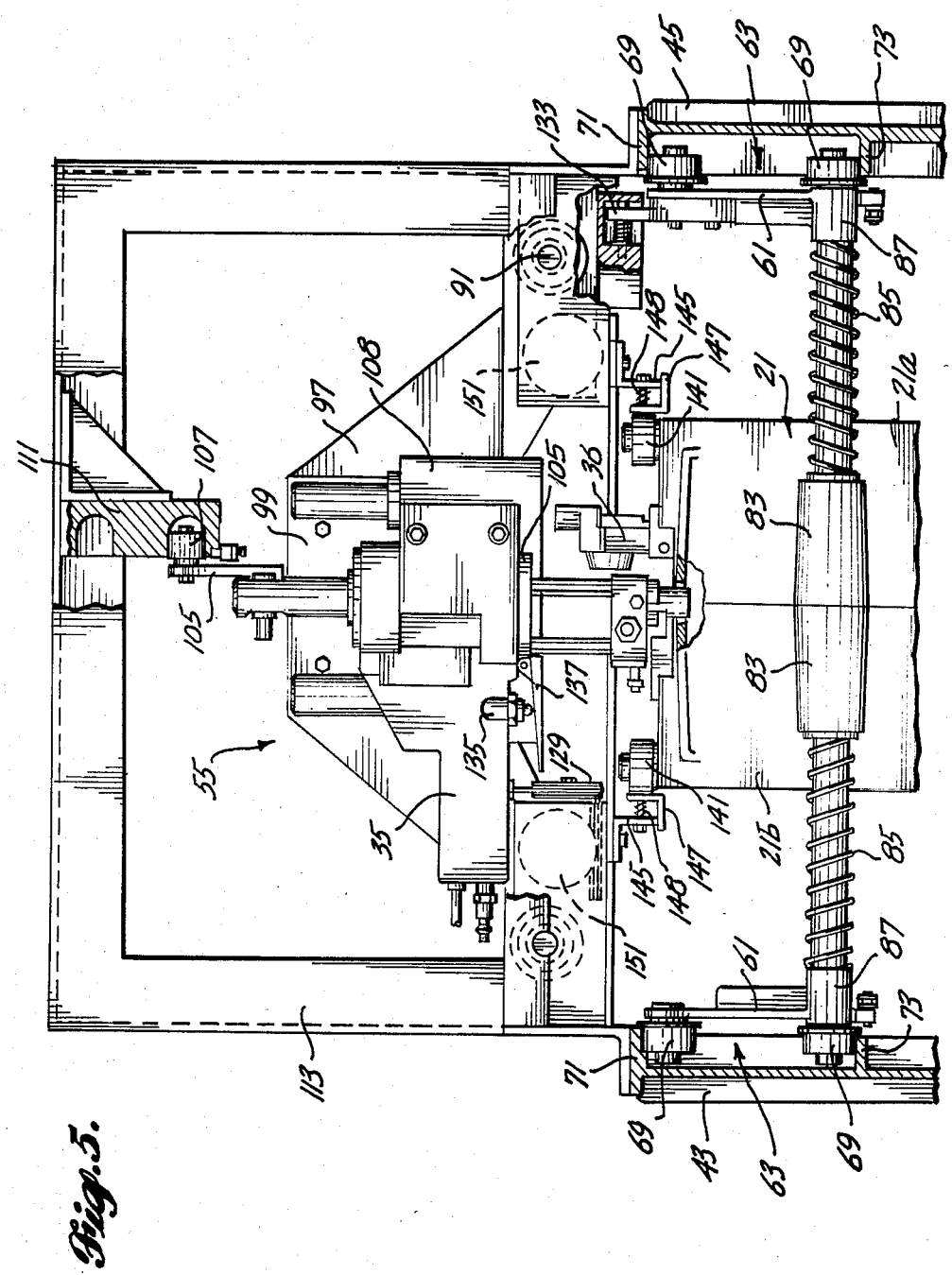
FIG. 5 is an end elevational view of the filling station of the machine illustrated in FIG. 2.

As previously described with respect to FIG. 1, the forming molds 21 each comprise two identical pieces 21a and 21b that join one another along a common vertical plane. As best shown in FIGS. 4 and 5, formed in the leading and trailing walls of the forming mold pieces 21a and 21b are elongate, cylindrical collars 83. The axis of the collars lies transverse to the direction of movement of the forming molds 21. The elongate, cylindrical collars are slidably mounted on leading and trailing rods 85. The leading and trailing rods 85 are mounted in hubs 87 formed on the inner sides of the ends of the curved arms of the T-shaped support plates 61. The axis of rotation of the leading and trailing rollers 69a and 69b is coincident with the longitudinal axes of the leading and trailing rods 85. In this regard, preferably, the leading and trailing rollers are rotatably mounted on extensions formed in the outer ends of the leading and trailing rods 85. Thus, the forming molds 21 are supported by the leading and trailing rollers 69a and 69b via the elongate collars 83 and the leading and trailing rods 85.

In summary, the conveyor mechanism includes a pair of T-shaped support plates 61 associated with each forming mold 21. Leading and trailing rods 85 are supported by the support plates 61; and, the leading and trailing rods support the forming molds 21. The T-shaped support plates 61 are supported by rollers that ride in tracks formed in vertical sidewalls lying on either side of the path-of-travel of the forming molds 21. The support plates and, thus, the forming molds are moved by a pair of chain-sprocket assemblies driven by an electric motor 49.

The foam material injection mechanism 55 is illustrated in FIGS. 3-7 and includes a pair of horizontal guide rods 91. The pair of horizontal guide rods 91 are supported by angle brackets 93. The angle brackets 93 are attached to the sidewalls 43 and 45 and lie above the path-of-travel of the forming molds 21 through the filling station 31. Further, the brackets 93 are positioned such that the longitudinal axis of the horizontal guide rods 91 lie parallel to the path-of-travel of the forming molds 21 through the filling station 31. Mounted on the horizontal guide rods 91 is a horizontal carriage 95. Mounted atop the horizontal carriage 95 is a vertical plate 97. The plane of the vertical plate 97 lies orthogonal to the path-of-travel to the forming molds 21. Mounted on the side of the vertical plate 97 facing the entrance end of the filling station 31 is a plate 98 that supports a pair of vertical guide rods 99. More specifically, the vertical guide rods 99 include cylindrical outer ends having a vertical longitudinal axis and a web connecting the cylindrical outer ends to the plate 98. Mounted on the cylindrical outer ends of the vertical guide rods 99 is a vertical carriage 101. The vertical carriage 101 supports the foam gun 35 such that the nozzle 37 of the foam gun is vertical and overlies the center of the path-of-travel of the forming molds 21. While foam guns can be obtained from various sources one suitable source is the Gusmer Corporation, 1 Gusmer Drive, Lakewood, N.J.

Figure 6:
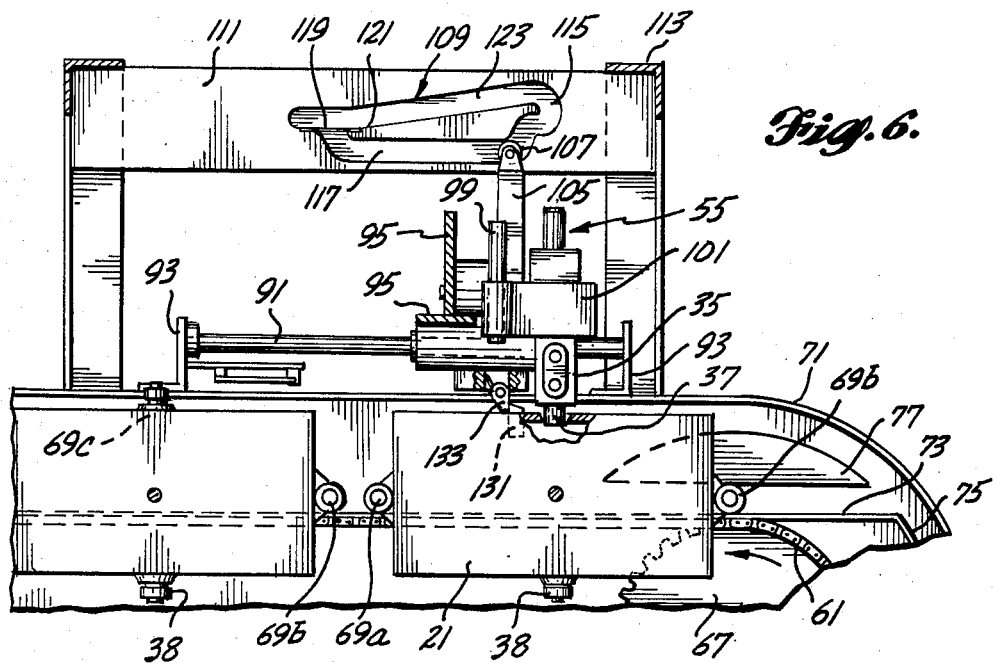
FIG. 6 is a cross-sectional elevational view of the filling station of the machine illustrated in FIG. 2 showing the foam gun located at the entrance end of the filling station.
Figure 7:
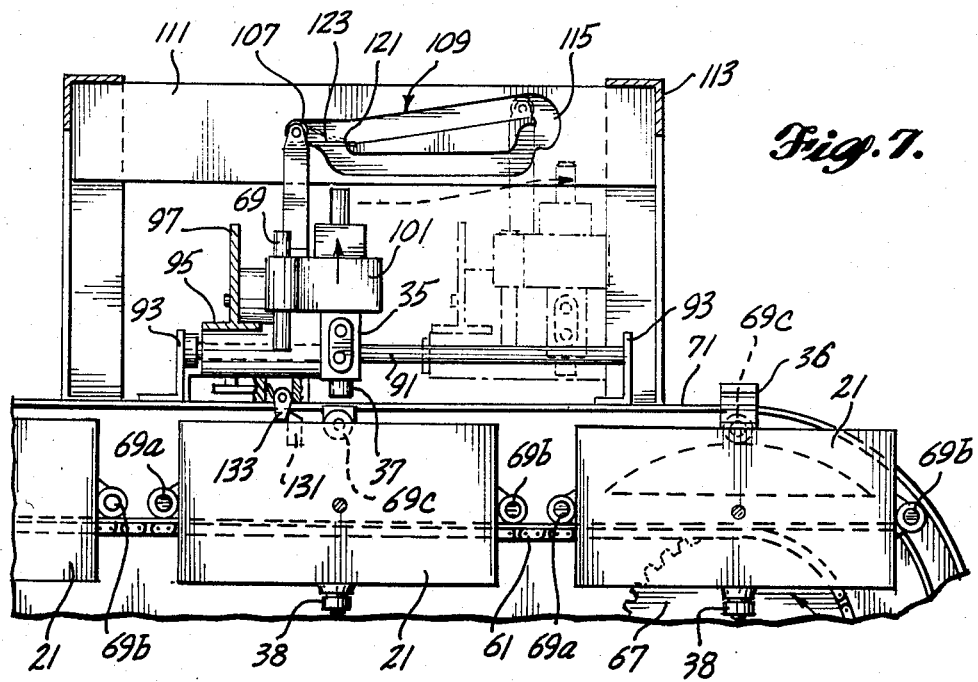
FIG. 7 is a side elevational view of the filling station of the machine illustrated in FIG. 2 showing the foam gun located at the exit end of the filling station.

Projecting upwardly between the vertical guide rods 99 is a vertical arm 105. A roller 107 is rotatably attached to the upper end of the vertical arm 105. The axis of rotation of the roller 107 is horizontal and orthogonal to the direction of movement of the forming molds 21. The roller 107 lies in a guideway 109 formed in a block 111 supported above the vertical carriage 101 by a framework 113. The block 111 and, thus, the guideway, lies along an axis lying parallel to the path-of-travel of the forming molds 21. As shown in FIGS. 3, 6 and 7, the leading end 115 of the guideway 107 is shaped somewhat the same as a question mark. The question mark shaped end 115 merges into a horizontal slot 117 that curves upwardly near its trailing edge, ending at a flap 119. The flap 119 is attached at its leading edge 121 but not at its trailing edge. Thus, the trailing edge is raised when impinged thereon by the roller 107 in the manner hereinafter described. An inclined slot 123 extends from the region above the flap 121 to the leading edge of the question mark shaped leading end 115. The length of the inclined slot 123 is such that, after passing through the aperture closed by the flap 119, the roller 107 can be moved to a downstream position to allow the flap 119 to close.

When not being moved by a forming mold 21 in the manner hereinafter described, the horizontal carriage 95 and, thus, the mechanism mounted on the horizontal carriage 95 are maintained near the upstream end of the filling station 31 by a spring loaded cable assembly 125 best illustrated in FIG. 4. The spring loaded cable assembly 125 includes a spring loaded sheave 127 mounted beyond the downstream end of the pair of horizontal guide rods 91. The spring loaded sheave 127 has a vertical axis of rotation. A cable 130 extends from the spring loaded sheave 127 around an idler sheave 129. The idler sheave 129 rotates about a horizontal axis and is positioned upstream of the horizontal carriage 95. After passing around the idler sheave 129, the cable 130 is attached to the horizontal carriage 95. As illustrated by the arrow 132 in FIG. 4, the force direction of the spring loaded sheave 127 is such that the horizontal carriage 95 is pulled toward the entrance end of the filling station 31. As illustrated in FIG. 3, the roller 107 lies in the center region of the question mark shaped end 115 of the guideway 109 when the horizontal carriage 95 is in its quiescent position near the entrance end of the filling station 31.

Mounted on the inner face of one of the pair of T-shaped support plates 61 associated with each forming mold 21, near the apex thereof is a bar 131. Mounted on the horizontal carriage 95, in line with the bars 131, is a spring loaded arm 133. The lower end of the spring loaded arm 133 is positioned to be impinged on by the bars 131.

When a bar 131 impinges on the spring loaded arm 133, some of the drive force applied to the T-shaped support plate 61 by the chain 65 is transferred to the horizontal carriage 95. As a result, the horizontal carriage is moved from the entrance end of the filling station 31 toward the exit end. As the horizontal carriage begins to move, the vertical carriage 101 is first moved downwardly due to the force applied to it via the arm 105 as the roller 107 moves down as it follows the guideway 109. As the vertical carriage 101 moves down, the nozzle 37 moves into the hole 34 in the top of the forming mold 21 whose associated bar 131 is impinging on the spring loaded arm 133. As previously described with respect to FIG. 1 this hole is uncapped at this point. As the nozzle 37 enters the hole 34, the downward movement of the vertical carriage 101 causes a microswitch 135 (FIG. 5) to impinge on a spring loaded arm 137. This impingement actuates the microswitch 105, which starts a timer that causes the foam gun 35 to begin injecting resin, curing and foaming agent materials into the forming mold 21. Material injection continues as the forming mold 21 continues to move through the filling station 31 until the timer times out. The timer timeout time is, of course, set to allow the proper amount of material to be injected into the forming mold 21. When the roller 107 reaches the end of the horizontal guideway slot 117 it moves upwardly, whereby the vertical carriage 107 is raised. As the vertical carriage 107 is raised, the nozzle 37 is withdrawn from the hole 34. After passing through the aperture covered by the flap 119, the pressure applied by the block 131 against spring loaded arm 133 overcomes the spring force. As a result, the spring loaded arm rotates until the block 131 slides past the spring loaded arm, when this occurs the associated forming mold is released. Thereafter, the force applied by the spring loaded sheave 127 to the horizontal carriage via the cable 130 returns the horizontal carriage 95 to the entrance end of the filling station 31. As this occurs, the inclined slot 123 applies a force to the vertical carriage via the roller 107 and the arm 105 that slightly raises the vertical carriage. The vertical carriage is then lowered when the roller 107 enters the question mark shaped end 115 of the guideway 109.

As described above, when the forming molds 21 enter the filling station 31, the cap-latch 36 is open. As a result, the tops of the two pieces 21a and 21b of the forming mold 21 are not tightly latched together. In order to avoid the leakage of the resin, curing and forming agent materials injected into the closed mold by the foam gun 103 that might occur as a result of the lack of latching, a mechanism is provided at the filling station 31 that presses the tops of the forming mold pieces 21a and 21b together. This mechanism includes a pair of rollers 141, one mounted atop each forming mold piece 21a and 21b. The rollers are laterally aligned with the hole 34. A corresponding pair of rollers 143, not engaged in the filling station, but engaged in the manner hereinafter described at the ejection station, are located in the bottom wall of the forming molds 21. The axis of rotation of both pairs of rollers is vertical. Further, the periphery of at least a portion of all of the rollers extends beyond the adjacent vertical edges of the associated forming mold 21.

As illustrated in FIGS. 4 and 5, mounted in the housing 41, on either side of the top of a forming mold 21 moving through the filling station 31 is an elongate angle bracket 145. The angle brackets 145 include vertical edges that face one another and, thus, the path-of-travel of the forming molds 21. As best seen in FIG. 5, each bracket 145 supports an elongate angle pressure plate 147. One leg of the pressure plates 147 lie under the vertical leg of the brackets 145. The other leg of the pressure plates lies parallel to the vertical leg of the bracket 145. Located between the vertical legs of the bracket 145 and the vertical leg of the pressure plates 147 are a plurality of coil springs 148, mounted on supporting bolts. As a result, the pressure plates are spring-loaded away from the brackets 145, i.e., the spring force presses the pressure plates toward the forming molds 21. The positioning of the brackets 145 is such that the rollers 141 mounted atop the forming molds 21 impinge on the pressure plates whereby the upper region of the forming molds 21 are pressed together. In this way, leakage of liquid resin, curing and forming agent materials is prevented as forming molds 21 move through the filling station 31, even though their cap-latchs 36 are open.

As discussed above, after the nozzle 37 is withdrawn from the hole 34 in a forming mold 21, the foam material injection mechanism 55 is returned to the downstream end of the filling station 31, using power supplied by the spring-loaded sheave 127. In order to prevent the application of undue force to this mechanism, a pair of dash pots 151 are provided. The dash pots 151 are located on opposite sides of the horizontal carriage 95 along the edge thereof facing the entrance end of the filling station. The dash pots 151 impinge on the brackets 93 that support the horizontal guide rods 91, when the horizontal carriage 95 is returned to the entrance end of the filling station 31.

FIGS. 8 and 9 illustrate in detail the preferred shape of the cap-latch 36. The illustrated cap-latch 36 includes two elements—a spring loaded hinge element 152 and a latch element 154. The spring loaded hinge element 152 includes a base 153 attached to one of the pieces 21a of the forming mold 21 in transverse alignment with the hole 34. A pin 155 passes through a pair of arms 157 formed in the side of the base 153 facing the hole 34. Thus, the axis of the pin 155 lies parallel to the path-of-travel of the forming molds 21. Also mounted on the pin 155 are a second pair of arms 159, which form an integral part of a cap/latch piece 161. The cap/latch piece forms a second part of the spring loaded hinge element 152. Located between the arms 159 of the cap/latch piece 161 is a coil spring 163, which forms another part of the spring loaded hinge element 152. The spring force is such that the cap/latch piece 161 is biased toward its open position, i.e., away from the hole 34.

The cap/latch piece 161 includes a body 165 and an integral cap 167 sized and positioned so as to fit into the hole 34 when the cap/latch piece 161 is latched in the manner described below. Projecting orthogonally outwardly from the body 165 of the cap/latch piece 161 at the end remote from the hinge arms 159 is a delatch arm 169. The outer end of the delatch arm 169 is V-shaped. Extending outwardly from the delatch arm 169 is a V-shaped ledge 171. The V-shaped ledge 171 extends outwardly from the side of the delatch arm 169 remote from the side facing the base 153 when the cap/latch piece 161 is in its delatched position illustrated in FIG. 8. When the cap/latch piece 161 is latched, as illustrated in FIG. 9, the apex of the V-shaped ledge 171 faces the top of the forming mold 21.

Mounted in the delatch arm 169 on either side of the body 165 of the cap/latch piece 161 is a spring-loaded ball detent 173. The spring-loaded ball detents 173 include coil springs and balls. The coil springs press against balls so that a portion of the periphery of the balls lie beyond the face of the side of the detent arm 169 opposite the side from which the V-shaped ledge 171 extends.

The latch element 154 of the cap-latch 36 is mounted on top of the other piece 21b of the forming mold 21. The latch element 154 is also transversely aligned with the hole 34 and includes a base member 177 having a pair of outwardly extending arms 179 that lie on either side of the hole 34. Extending upwardly from each of the outwardly projecting arms 179 is a detent leg 181. The detent legs 181 each include a slot 183 formed in the side of the detent legs facing away from the spring loaded hinge element 152. The slots 183 are laterally aligned with the detents 173 formed in the delatch arm 169 of the cap/latch piece 161. Further, the distance between the detent legs 181 and the base 177 of the latch element 154 is equal to or slightly greater than the thickness of the delatch arm 169 of the cap/latch piece 161.

As illustrated in FIG. 4, a latch closer mechanism 185 is located at the end of the filling station 31. As shown best in FIG. 8, the latch closer mechanism includes a bent rod 187 positioned to impinge on the cap/latch piece 161 as each forming mold leaves the filling station. The impingement applies a force to the cap/latch piece 161 that acts against the bias provided by the coil spring 163. The impingement force is adequate to overcome the spring bias force and rotate the cap/latch piece 161 downwardly, moving the cap 167 into the hole 34. The position of the bent rod is such that the spring loaded ball detents 173 are moved to a position in alignment with the slots 183 located in the legs 181 of the latch element 154. When this position is reached, the balls of the spring-loaded ball detent 173 are forced into the slots 183, whereby the cap/latch piece 161 is latched closed, as illustrated in FIG. 9. The cap/latch piece 161 remains latched closed as the forming molds 21 moved through the curing station 32.

As illustrated in FIG. 10, other than the conveyor mechanism, the only element of significance mounted in the housing 41 along the path-of-travel 22 through the curing station 32 are heater elements 191. The heater elements 191 are, preferably, located at the bottom of the housing and raise the temperature of the curing station to approximately 140° F. As will be readily understood by those familiar with curing foam products, such as foam building blocks, this temperature significantly shortens foam curing time.

Figure 14:
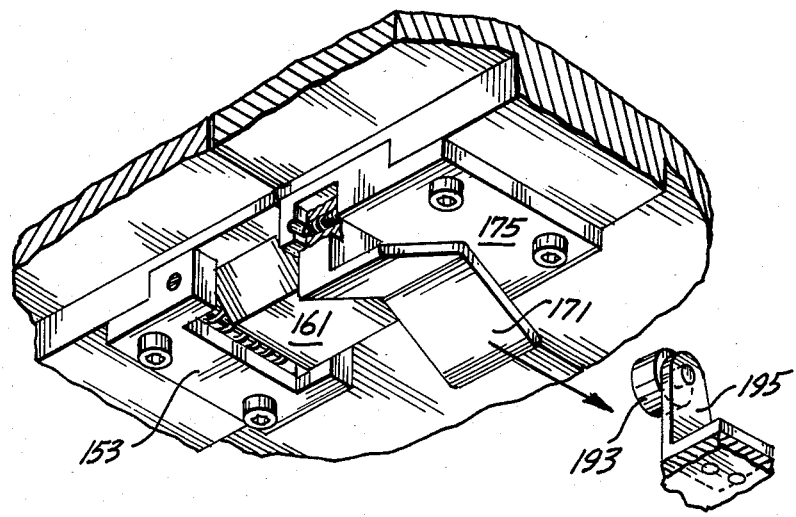
FIG. 14 is a pictorial view of the cap-latch and the mechanism that opens the cap-latch as each mold enters the injection station.
Figure 15:
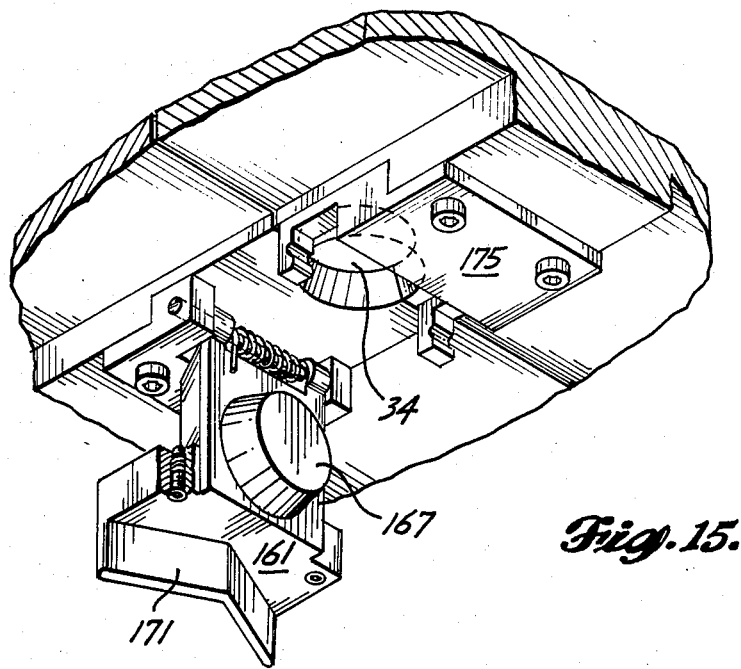
FIG. 15 is a pictorial view showing the cap-latch in the open position achieved after passing the opening mechanism illustrated in FIG. 14.

After passing through the curing station 32, as illustrated in FIG. 1 and previously described, the forming molds 21 enter the ejection station 33, which is illustrated in FIGS. 11, 13 and 16-18. As each forming mold 21 enters the ejection station 33, its cap-latch 36 and its latch 38 are opened. The mechanism for opening the cap-latch 36 is illustrated in FIG. 14. The illustrated mechanism comprises the V-shaped ledge 171 forming part of the cap/latch piece 161 and a roller 193 mounted on a suitably positioned bracket 195 mounted in the housing 41. More specifically, the bracket 195 is positioned such that the roller 193 impinges on the ramp created by the V-shaped ledge 171 as a forming mold 21 enters the ejection station 33. This impingement applies a delatching force to the cap-latch piece 161, causing the balls of the spring loaded ball detents 173 to move inwardly. After the detent balls have cleared the slots 183 formed in the legs 181 of the latch element 154, the bias created by the coil spring 163 swings the cap-latch piece 161 to the fully open position illustrated in FIG. 15.

Since the latch 38 is the same as the cap/latch 36, except that it does not include a protruding cap, the latch 38 will not be described here. Not only is the latch 38 the same as the latch part of the cap/latch 36, the mechanisms for opening and closing the latch 38 are the same and, thus, are also not described in detail here.

As will be readily appreciated by those familiar with the curing of foam products, such as foam building blocks, pressure is formed inside of the forming molds 21 during the curing process. This pressure is applied by the forming mold pieces 21a and 21b to the cap/latch 36 and the latch 38. In accordance with the invention, a mechanism is provided for relieving this pressure and, thereby, making the cap/latch and the latch easier to open. The mechanism comprises top and bottom pairs of spring loaded plates 197 located on opposite sides of the path-of-travel 22 of the forming molds 21 as they enter the ejection station. The spring loaded plates are positioned to impinge on the outer periphery of the top and bottom pairs of rollers 141 and 143 as the V-shaped ledges 171 of the cap/latch and the latch impinge on the opening rollers 193. The spring loaded plates are oriented such that the impingement of the top and bottom pairs of rollers 141 and 143 on the plates causes an inward force that relieves the pressure on the cap/latch 36 and the latch 38, making them easier to open. As best illustrated in FIG. 13, the top and bottom spring-loaded plates 197 are, preferably, supported by top and bottom angle brackets 201 and 203 mounted in the housing 41, on opposite sides of the path-of-travel 22 of the forming molds 21.

After the cap/latch 36 and the latch 38 are open, the continued movement of the forming molds 21 brings the upper pair of rollers 141 into contact with the outer surface of a pair of rail cams 205 located on opposite sides of the path-of-travel 22 of the forming molds 21, as best illustrated in FIG. 17. More specifically, mounted above the path-of-travel 22 of the forming molds in the ejection station is an apertured plate 207. The apertured plate supports the pair of rail cams 205, which project downwardly. Each of the rail cams 205 includes a first section 206 that diverges away from the path-of-travel 22 of the forming molds 21 followed by a short section 208 that lies parallel to the path-of-travel 22 of the forming molds 21. The short section 208 is followed by a converging section 210 that converges toward the path-of-travel 22 of the forming molds. When the upper rollers 141 impinge on the diverging section 206, a force is applied to the forming mold pieces 21a and 21b that forces the pieces apart. The forming mold pieces 21a and 21b are forced apart, compressing the coil springs 88 mounted on the leading and trailing rods 85, until the distance between the pieces is greater than the horizontal width of the foam building block 39 formed in the forming mold 21. This position is reached slightly before the upper rollers 141 impinge on the short, parallel sections 208 of the rail cams 205. See FIG. 16.

As will be readily appreciated by those familiar with molding, particularly molding foam items, such as foam building blocks, it is highly likely that the foamed item will stick to one of the mold pieces as mold pieces are separated. The present invention overcomes this problem by providing a centering mechanism that holds the foam building block 39 centered as the forming mold pieces 21a and 21b are forced to move apart by the just described mechanism. The centering mechanism includes an orthogonal rod 211 located substantially in the center of the vertical sidewalls of each of the forming mold pieces 21a and 21b. The rods 211 are slidably mounted in apertures 213 formed in hubs 215 formed in the sidewalls. The inner ends 217 of the rods 211 are enlarged, preferably having a configuration similar to that of the head of a conventional internal combustion engine valve.

Figure 13:
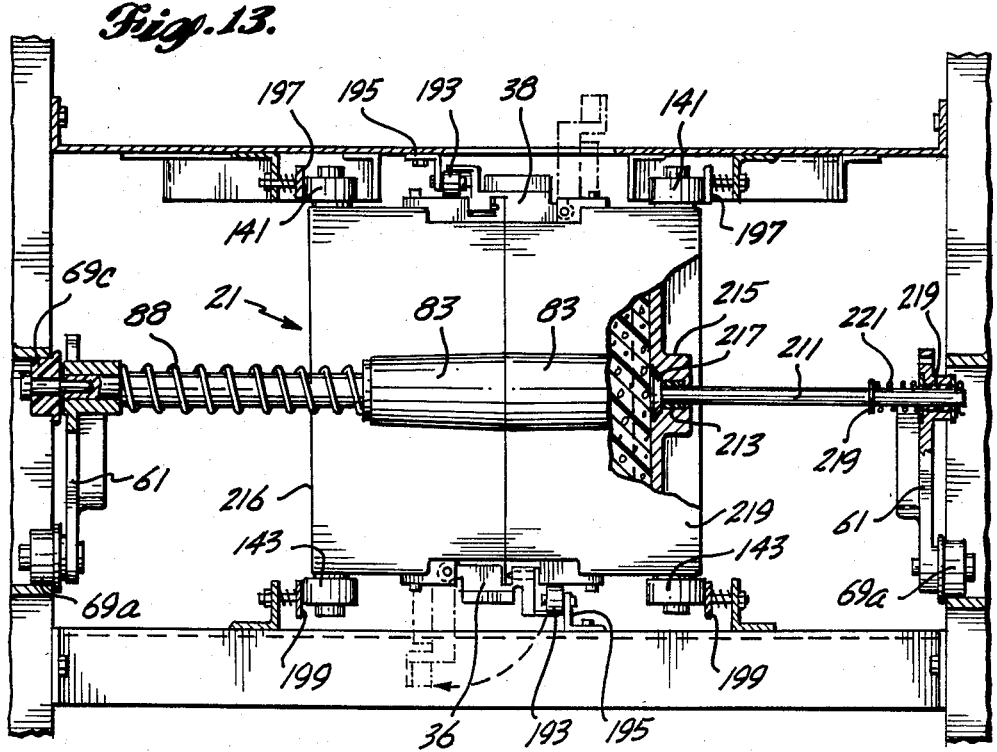
FIG. 13 is a front elevational view of a mold entering the ejection station.
Figure 16:
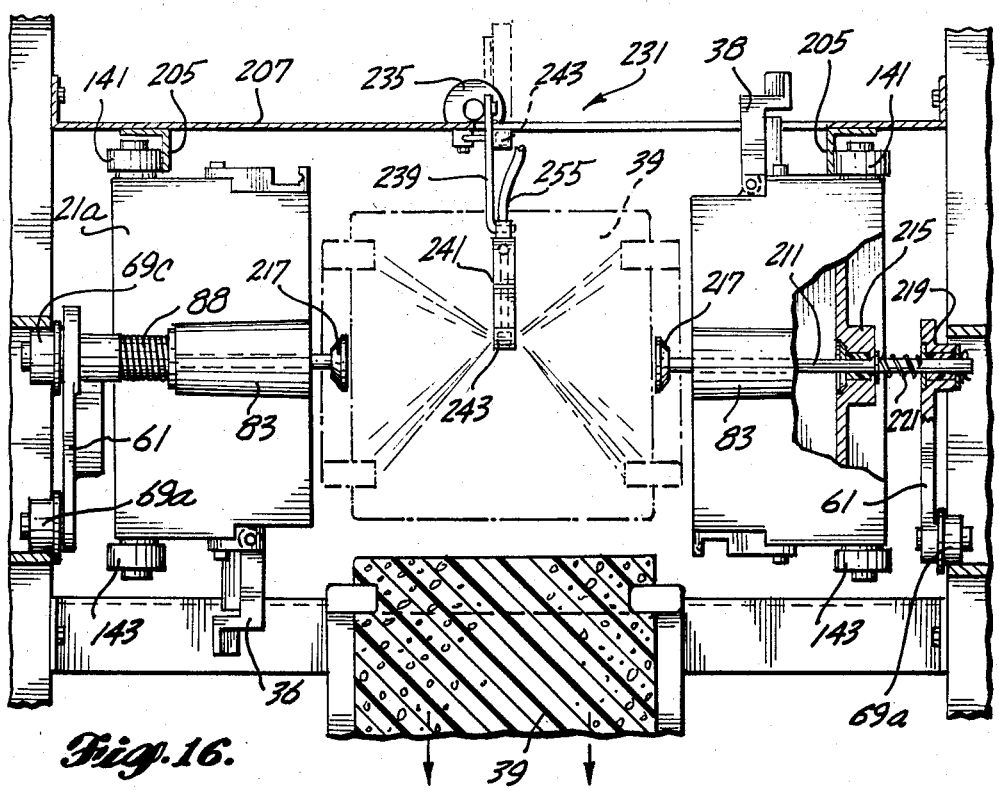
FIG. 16 is a front elevational view of an open mold in the center of the ejection station.

The outer ends of the rods 211, as shown in FIGS. 12, 13 and 16, are slidably mounted in hubs 219 formed in the legs of the T-shaped support plates 61, which form a part of the previously described conveyor mechanism. Mounted on the rods 211, on the side of the support plates 61 facing the forming molds, is a coil spring 221. The end of the coil spring facing the forming mold impinges on collars 225 affixed to the rods 211. For example, the collars may be C-shaped washers affixed to the rods 211 by sliding into circumferential slots formed in the rods. As a result of this arrangement, a spring force directed toward the centerline of the path-of-travel 22 of the forming molds 21 is applied to the rods 211. As a result, when the forming mold pieces 21a and 21b are moved apart in the manner previously described, the enlarged ends 217 of the rods 211 remain pressed against the sides of the foam building block 39. Thus, the foam building block 39 is forced out of the forming mold pieces 21a and 21b as the forming mold pieces are moved apart. In this way, the foam building blocks 39 are prevented from sticking to the forming mold pieces 21a and 21b.

Just prior to the upper rollers 141 leaving the diverging sections 206 of the rail cams 205 and entering the short, parallel sections 208, the hubs 215 surrounding the mold sidewall apertures through which the rods 211 pass impinge on the collars 225 mounted on the rods 211. The continued lateral movement of the forming mold pieces 21a and 21b occurring as the upper rollers 141 reach the end of the diverging sections 206 and enter the short, parallel sections 208 of the rail cams 205 causes a slight outward movement of the rods 211 and a slight compression of the coil springs 221 mounted on the rods. As a result, the enlarged ends 217 of the rods are moved a slight distance away from the sides of the foam building block 39. While the foam building block may drop from the space between the enlarged ends 217 of the rods 211 as they move laterally, if the block rotates slightly it may remain held between the enlarged ends. This problem is overcome by an ejection mechanism 231, which is next described.

The ejection mechanism 231 includes a microswitch 233 (FIG. 17) actuated by the outer periphery of one of the upper rollers 141 just prior to the upper rollers moving from the diverging sections 206 of the rail cams 205 to the short, parallel sections 208. Actuation of the microswitch 233 causes the energization of a solenoid 235 mounted on the plate 207. When the solenoid 235 is energized, its slug 237 moves inwardly.

Mounted on the outer end of the solenoid slug 237 is the short leg of an L-shaped lever arm 239. The L-shaped lever arm is mounted for rotation about the junction 240 between the legs of the arm. The axis of rotation is horizontal and transverse to the path-of-travel 22 of the forming molds 21. The outer end of the other leg of the L-shaped lever arm 239 is rotatably attached to the upper end of a vertical arm 241. The lower end of the vertical arm 241 is affixed to and supports one end of a horizontal bar 243. The other end of the horizontal bar 243 is affixed to and supported by the lower end of a second vertical arm 245. The upper end of the second vertical arm is attached by a rod 247 to the plate 207. Both attachment ends of the rod 247 are rotatable. The length of the longer leg of the lever arm 239, the vertical arms 241 and 245 and the rod 247 and their position is such that, when the L-shaped lever arm is rotated by the solenoid slug 237 being retracted, the horizontal bar 243 is moved downwardly while remaining horizontal. The orientation of the just described mechanism is such that the horizontal bar 243 lies above the center of the path-of-travel of the foam building blocks through the ejection station 33. As a result, when the horizontal bar 243 is moved downwardly, it impinges on the top of a foam building block if one is wedged between the enlarged ends 217 of the rods 211 and pushes the foam building block out of this location. In this way, foam building blocks are ejected from between the rods 211.

In addition to ejecting wedged foam building blocks, the ejection mechanism also provides a means for spraying a releasing agent into the interior of the forming mold pieces 21a and 21b. More specifically, the horizontal bar 243 is hollow—preferably, a square hollow tube. The side of the tube facing the forming molds include a series of holes 251. Mounted atop the horizontal bar 243 is a manifold 255. Preferably, the manifold 255 is formed of a U-shaped tube having downwardly projecting legs attached to the upper surface of the horizontal bar 243. The manifold 255 is connected to a suitable source of releasing agent. A suitable electronic control mechanism (not shown) controls supplying the pressurized releasing agent to the manifold and, thus, the horizontal bar holes 251 as the horizontal bar 243 is moved downwardly in the manner heretofor described. If desired, rather than spraying releasing agent into every mold, every other, every third, etc. mold can be sprayed. This result is readily accomplished under the control of a counter circuit incremented each time the microswitch 233 is actuated.

After a predetermined period of time has elapsed, releasing agent emission terminates and the horizontal bar 243 is raised. The timing is, of course, adequate for the horizontal bar 243 to clear the region between the forming mold pieces 21a and 21b before the forming mold pieces join one another and the mold is closed. Closure occurs as the upper rollers 141 follow the converging sections 210 of the rail cams 205. The closure force is provided by the coil springs 88 mounted on the leading and trailing forming mold support rods 85. Located at the end of the ejection station 33 is a latch closure mechanism 261 similar to the latch closure mechanism 185 located at the exit end of the filling station 31. More specifically, the latch closure mechanism 261 comprises a bent rod 263 that impinges on and closes the latch 38 of the forming molds. As discussed above, the cap/latch 36 remains open until the forming molds pass through the filling station 31 and receive resin, curing and forming agent materials in the manner previously described.

As will be readily appreciated from the foregoing description, the invention provides a machine for manufacturing solid items formed from liquid raw materials, such as foam building blocks formed from liquid resin, curing and forming agent materials. While a preferred embodiment of the invention has been illustrated and described, it will be appreciated that various changes can be made therein without departing from the spirit and scope of the invention. Further, it is to be understood that items other than foam building blocks can be manufactured using a machine formed in accordance with the invention. Consequently, the invention can be practiced otherwise than as specifically described herein.

The embodiments of the invention in which an exclusive property or privilege is claimed are defined as follows:

1. A machine for forming molded items, the machine having a plurality of forming molds, each forming mold including pieces movable with respect to one another such that the forming mold can be changed between a closed configuration in which the pieces form a mold cavity having a hole for injection of raw materials and a separated configuration in which a molded item can be removed from the forming mold, the machine further having conveyor means for supporting and moving the forming molds along a path-of-travel through filling and ejection stations, filling means located at the filling station for injecting raw materials through the holes into the forming molds, and ejection means located at the ejection station for removing molded items from the forming molds, characterized in that the forming molds move through the filling station in the closed configuration and the filling means includes a gun having a nozzle, a positioning mechanism for lowering the nozzle into the holes in the forming molds as the forming molds enter the filling station and for moving the gun with the movement of the forming molds as the forming molds move through the filling station, and means for injecting the raw materials into the closed forming molds through the nozzle as the forming molds move through the filling station.

2. A machine according to claim 1, further characterized in that the positioning mechanism includes a horizontal carriage movable along a path-of-travel above and parallel to the path-of-travel of the forming molds through the filling station, and a vertical carriage mounted on the horizontal carriage and movable toward and away from the path-of-travel of the forming molds through the filling station.

3. A machine according to claim 2, further characterized in that the positioning mechanism also includes a vertical arm mounted on the vertical carriage, a follower mounted on the upper end of the arm, and a guideway mounted above the follower, the follower lying in and following the path defined by the guideway, the guideway path defining the path-of-travel followed by the horizontal and vertical carriages.

4. A machine for forming molded items, the machine having a plurality of forming molds, each forming mold including two pieces movable with respect to one another such that the forming mold can be changed between a closed configuration in which the pieces form a mold cavity and a separated configuration in which a molded item can be removed from the forming mold, each forming mold further including latch means for latching the two pieces together, the machine further having conveyor means for supporting and moving the forming molds along a path-of-travel through filling and ejection stations, filling means located at the filling station for injecting raw materials into the closed forming molds, and ejection means located at the ejection station for removing molded items from the forming molds, characterized in that the latch means comprises first and second latches located respectively on first and second sides of the forming mold, the first side of the forming mold includes a hole through which the raw materials are injected into the forming mold, and the first latch includes a cap positioned to close the hole when the first latch is closed.

5. The machine according to claim 4, further characterized in that the ejection means includes means for closing the second latch.

6. A machine for forming molded items, the machine having a plurality of forming molds, each forming mold including two generally mirror image pieces movable with respect to one another such that the forming mold can be changed between a closed configuration in which the pieces form a mold cavity and a separated configuration in which a molded item can be removed from the forming mold, each forming mold further including latch means for latching the two pieces together, the machine further having conveyor means for supporting and moving the forming molds along a path-of-travel through filling and ejection stations, filling means located at the filling station for injecting raw materials into the closed forming molds, and ejection means located at the ejection station for removing molded items from the forming molds, characterized in that the ejection means includes delatching means located at the entrance of the ejection station for opening the latch means as the forming molds enter the ejection station, and separating means located at the ejection station for separating the forming mold pieces.

7. A machine according to claim 6, further characterized in that the ejection means includes centering means for maintaining a molded item centered between the forming mold pieces as the forming mold pieces are separated until the forming mold pieces reach a predetermined position adequate to allow the molded item to be removed.

8. A machine according to claim 7, further characterized in that the ejection means includes an ejection mechanism located at the ejection station for ejecting molded pieces from the centering means.

9. A machine according to claim 6, further characterized in that the delatching means includes means for applying pressure to the forming molds laterally in line with the latch means.

10. A machine for forming molded items, the machine having a plurality of forming molds, each forming mold including pieces movable with respect to one another such that the forming mold can be changed between a closed configuration in which the pieces are joined along a predetermined plane to form a mold cavity and a separated configuration in which a molded item can be removed from the forming mold, the machine further having conveyor means for supporting and moving the forming molds along a path-of-travel through filling and ejection stations, filling means located at the filling station for injecting raw materials into the closed forming molds, and ejection means located at the ejection station for removing molded items from the forming molds, characterized in that the path-of-travel followed by the forming molds is horizontally elongate and lies in a vertical plane, the filling station is located above the ejection station, and the forming molds are rotated 180° as they are moved along the path-of-travel between the filling station and the ejection station.

11. A machine according to claim 10, wherein each forming mold includes two generally mirror image pieces, further characterized in that the predetermined plane along which the two forming mold pieces are joinable is vertical and coincident with the vertical plane in which the path-of-travel lies.

12. A machine according to claim 11, further characterized in that the conveyor means includes support tracks located on opposite sides of the path-of-travel and support brackets attached to the forming molds and supported by the support tracks.

13. A machine according to claim 12, further characterized in that the conveyor means also includes chains and sprockets mounted on opposite sides of the path-of-travel, and the support brackets are attached to the chain such that the movement of the chain moves the support bracket and therefore the forming molds.

14. A machine according to claim 10, wherein the path-of-travel includes a curing station between the filling and ejection stations and wherein the machine includes curing means located at the curing station for assisting the curing of the raw materials, further characterized in that the forming molds are rotated 180° prior to reaching the curing station.

* * * * *